Patented May 16, 1939

2,158,091

UNITED STATES PATENT OFFICE 2,158,091

STABILIZED SALTS OF ACETYL SALICYLIC ACID

Joseph R. Stevens, Rahway, N. J., assignor to Merck & Co. Inc., Rahway, N. J., a corporation of New Jersey No Drawing. Application February 6, 1937, Serial No. 124,479

5 Claims. (Cl. 23—250)

This invention relates to medicines and pharmaceutical products particularly to stabilized salts of acetyl salicylic acid commonly known as aspirin. The advantages of such salts e. g. calcium and magnesium acetyl salicylate, over free acetyl salicylic acid, are well known. See for example: Die Therapie der Gegenwart 1911, vol. 52, pages 309 to 311 (July 1911).

Salicyclic acid has been known and used for many years as an analgesic, both for external and internal use and the administration of salicylic acid in one form or another is known as salicylic therapy. Salicylic acid is a phenolic body containing a phenolic radical in ortho position to a carboxyl radical both radicals being substituted for hydrogen in the benzene nucleus.

Salicylic therapy was advanced with the discovery of acetyl salicylic acid, now commonly referred to as aspirin. In aspirin an acetyl radical is substituted for the hydrogen of the phenolic radical of salicylic acid and this substitution rendered salicylic acid less harmful. Nevertheless, the acetyl derivative of salicylic acid is not wholly free of disadvantages especially in large doses or with people whose physical idiosyncrasies make them especially sensitive to acetyl-salicylic acid.

The disturbances sometimes caused by administration of aspirin may be obviated by administration of its salts especially those of calcium and magnesium. Many persons possess a definite idiosyncrasy in respect of aspirin but suffer no ill effects from administration of salts thereof, e. g., alkaline earth salts. Calcium and magnesium acetyl salicylates in addition to their therapeutic advantages are very soluble in water and substantially tasteless, in contrast to the definite (and to many people) unpleasant taste of aspirin.

Unfortunately, however, the said salts are not particularly stable. They tend to decompose on long standing so that the above advantages may be partly or wholly absent when the decomposed product finally reaches the patient or consumer and is administered.

This instability has presented a problem to the solution of which efforts have been directed ever since the unstable properties of aspirin salts became known many years ago.

Thus it has been proposed to prepare calcium acetyl salicylate by an expensive method of procedure calculated to reduce the iron content to the merest trace on the theory that instability is caused by the presence of iron. See for example: U. S. Patent 2,003,374. In another proposal (U. S. Patent 1,993,743) control of the hydrogen ion concentration within narrow limits (during the reaction producing the salt) is thought to lead to stability.

According to the present invention undue complexities in the process of manufacturing the salt may be avoided. Any suitable manufacturing process for producing the salt may be employed and stabilization effected by the presence of a small proportion of ammonium chloride which possesses unsuspected stabilizing power. The ammonium chloride appears to act as an anti-catalyst or inhibitor of decomposition. This may be due to the presence of the nitrogen atom. The theory of the inhibition of decomposition by ammonium chloride is not definitely known but whatever may be the theory the fact has been discovered that ammonium chloride possesses hitherto unsuspected powers of inhibition of decomposition on salts of acetyl-salicylic acid in general and on alkaline earth salts of acetyl salicylic acid in particular, and the further fact has been found that to develop said inhibiting power to the highest degree, the composition containing the ammonium chloride should be substantially anhydrous.

Possessing as it does inhibiting power of a high degree it is possible to prepare a substantially tasteless and stable metallic salt of aspirin (acetyl-salicylic acid) by adequately incorporating an extremely small proportion of the ammonium chloride. One of the great advantages of calcium acetyl salicylate is its freedom from taste (as compared with free acetyl salicylic acid) and, were it necessary to incorporate substantial proportions of a taste-imparting stabilizing agent, the means would defeat the end, i. e. stabilization might be effected at the sacrifice of imparting disagreeable or noticeable taste. According to the present invention however, stabilization is attained without sacrificing tastelessness.

The following examples provide illustrative embodiments of the invention:

Example 1

| | Parts by weight |
|---|---|
| Calcium acetyl salicylate | 100 |
| Water | 100 |
| Ammonium chloride | 2 |

The calcium acetyl salicylate and ammonium chloride are dissolved in the water and the resulting solution evaporated to dryness at as low as possible a temperature, i. e. by employing reduced pressure and for a carrying agent such as an inert gas or vapor, until not more than traces of water remain.

*Example 2*

|  | Parts by weight |
|---|---|
| Calcium acetyl salicylate | 100 |
| Ethyl alcohol | 100 |
| Ammonium chloride | 2 |
| Water | 5 |

The calcium acetyl salicylate is made into a paste with alcohol in which the former is not readily soluble. The ammonium chloride is dissolved in the water and added to the said paste and thoroughly and uniformly mixed therewith. The paste is then boiled at a low temperature, preferably in vacuum, until not more than a trace of water remains.

A proportion of ammonium chloride of the order of one to two per cent of the weight of the salt of acetyl salicylic acid is recommended for most purposes. This proportion is insufficient to impart disagreeable taste to the salt of acetyl salicylic acid but sufficient to stabilize it.

Other means of incorporating ammonium chloride with salts of acetyl salicylic acid will suggest themselves to those skilled in the art in the light of the present disclosure and invention.

Having disclosed the principle and nature of the invention and certain specific illustrative examples and aspects thereof, it is intended to define the scope of the invention by the appended claims considered in the light of the foregoing description.

What I claim is:

1. A stabilized substantially tasteless salt composition containing an alkaline earth salt of acetyl salicylic acid and one to two percent ammonium chloride, said composition being substantially anhydrous.

2. A stabilized substantially tasteless calcium acetyl salicylate salt composition containing ammonium chloride in amount insufficient to impart disagreeable taste, but sufficient to effect substantial inhibition against decomposition, said composition being substantially anhydrous.

3. A stabilized substantially tasteless magnesium acetyl salicylate salt composition containing ammonium chloride in amount insufficient to impart disagreeable taste, but sufficient to effect substantial inhibition against decomposition, said composition being substantially anhydrous.

4. A stabilized salt composition containing an alkaline earth salt of acetyl salicylic acid and a proportion of ammonium chloride of the order of one to two per cent of the weight of said salt.

5. A stabilized salt of acetyl salicylic acid comprising an alkaline earth salt of acetyl salicylic acid mixed with a proportion of ammonium chloride insufficient to impart disagreeable taste but sufficient to effect substantial inhibition against decomposition.

JOSEPH R. STEVENS.